L. P. GARNER.
SEPARATING SLATE FROM COAL.
No. 29,479.
Patented Aug. 7, 1860.
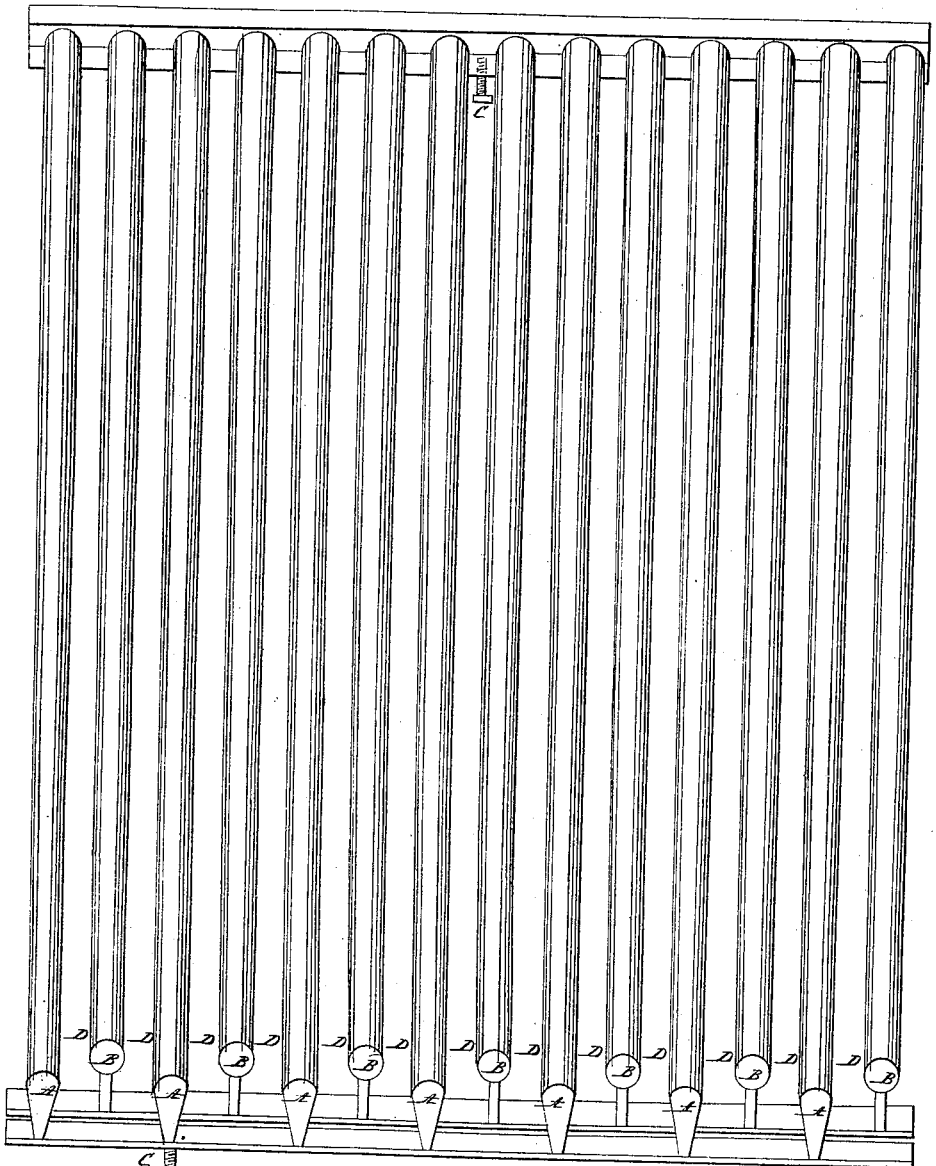

UNITED STATES PATENT OFFICE.

LEWIS P. GARNER, OF ASHLAND BOROUGH, PENNSYLVANIA.

APPARATUS FOR SEPARATING SLATE FROM COAL.

Specification forming part of Letters Patent No. 29,479, dated August 7, 1860; Reissued July 27, 1869, No. 3,568.

*To all whom it may concern:*

Be it known that I, LEWIS P. GARNER, of Ashland borough, in the county of Schuylkill and State of Pennsylvania, have invented a new and Improved Mode of Separating Slate and other Impurities from Coal and other Materials; and I do hereby declare that the following is a full and exact description thereof, reference being had to the accompanying drawings and to the letters of reference marked thereon.

The nature of my invention consists in the employment of two screens, the one lying within the other; one of such screens being movable so as to be raised or depressed at the pleasure of the operator; such raising and depression having, by reason of the shape of the bars of the screens, the effect of widening or narrowing the spaces between the bars, as shown in the accompanying drawings, A, A, A, &c., being the inside or movable screen; B, B, B, &c., being the outside or stationary screen; C, C, C, screws to raise or depress the inside screen; D, D, D, spaces which are widened or narrowed by raising or depressing the movable screen to permit larger or smaller pieces of slate and other refuse matter to fall through.

What I claim as my invention, and desire to secure by Letters Patent is—

The employment of the screen within the screen, movable, so that the inside screen may be raised or depressed at the will of the operator, thus increasing or diminishing the width of the spaces or openings between the bars, by reason of the peculiar shape of the bars, so that larger or smaller pieces of slate and other impurities may be separated from the coal and other materials that may be passed over said screens.

L. P. GARNER.

Witnesses:
A. P. SPINNEY,
M. M. MOCK.